United States Patent
Andrews

(10) Patent No.: US 7,624,063 B1
(45) Date of Patent: Nov. 24, 2009

(54) SYSTEM AND METHOD FOR IMPROVED DISTRIBUTION OF MARKET INFORMATION

(75) Inventor: Ryan N Andrews, Evanston, IL (US)

(73) Assignee: Trading Technologies International, Inc., Chicago, IL (US)

( * ) Notice: Subject to any disclaimer, the term of this patent is extended or adjusted under 35 U.S.C. 154(b) by 1074 days.

(21) Appl. No.: 10/675,449

(22) Filed: Sep. 30, 2003

(51) Int. Cl.
*G06Q 40/00* (2006.01)

(52) U.S. Cl. ....................................... 705/37

(58) Field of Classification Search .................... 705/37
See application file for complete search history.

(56) References Cited

U.S. PATENT DOCUMENTS

| | | | |
|---|---|---|---|
| 4,868,866 A | | 9/1989 | Williams, Jr. |
| 5,463,620 A | * | 10/1995 | Sriram ........................ 370/412 |
| 5,541,912 A | * | 7/1996 | Choudhury et al. ......... 370/412 |
| 5,867,483 A | * | 2/1999 | Ennis et al. .................. 370/252 |
| 5,912,877 A | * | 6/1999 | Shirai et al. ................. 370/228 |
| 5,978,387 A | * | 11/1999 | Sherman ..................... 370/468 |
| 6,130,887 A | * | 10/2000 | Dutta .......................... 370/347 |
| 6,144,727 A | | 11/2000 | Mashinsky |
| 6,240,460 B1 | * | 5/2001 | Mitsutake et al. ........... 709/235 |
| 6,345,038 B1 | * | 2/2002 | Selinger ...................... 370/230 |
| 6,400,954 B1 | * | 6/2002 | Khan et al. ................. 455/450 |
| 6,529,520 B1 | | 3/2003 | Lee et al. |
| 6,665,273 B1 | * | 12/2003 | Goguen et al. .............. 370/252 |
| 6,731,680 B1 | * | 5/2004 | Zornack ...................... 375/224 |
| 6,785,291 B1 | * | 8/2004 | Cao et al. .................... 370/431 |
| 6,876,668 B1 | * | 4/2005 | Chawla et al. .............. 370/468 |
| 7,096,260 B1 | * | 8/2006 | Zavalkovsky et al. ....... 709/223 |
| 7,161,907 B2 | * | 1/2007 | Mott ........................... 370/232 |
| 7,274,664 B2 | * | 9/2007 | Lopez et al. ................. 370/230 |
| 2002/0049666 A1 | * | 4/2002 | Reuter et al. .................. 705/37 |
| 2002/0116124 A1 | * | 8/2002 | Garin et al. .................. 701/213 |
| 2002/0143981 A1 | * | 10/2002 | DeLima et al. .............. 709/233 |
| 2003/0214966 A1 | * | 11/2003 | Taylor .......................... 370/432 |
| 2004/0024845 A1 | * | 2/2004 | Fishhaut et al. .............. 709/219 |
| 2004/0061805 A1 | * | 4/2004 | Shibamiya et al. .......... 348/565 |
| 2004/0264500 A1 | | 12/2004 | Bansal et al. |

OTHER PUBLICATIONS

Turner, J.: Managing bandwidth in ATM network with busy traffic, IEEE Network, Sep. 1992, pp. 50-58.*
Abraham et al.; StorAge enhanced any-to-anydat mirroring solution for cost effective data recovery, Storage Networking Technologies, Sep. 16, 2003, pp. 1-3.*
Shigiltchoff et al.; Adaptive multiversion data broadcast organizations, www.elseviercomputerscience.com, Information Systems 29, (2004), pp. 509-524.*

* cited by examiner

*Primary Examiner*—Bijendra K Shrestha
(74) *Attorney, Agent, or Firm*—McDonnell Boehnen Hulbert & Berghoff LLP

(57) ABSTRACT

A data distribution system and method are described herein to improve the distribution of market information to subscribing client devices. Market information updates are provided to subscribing devices over a communication link every time a change in the market occurs. If a bandwidth limitation is reached on the communication link, the preferred embodiments switch to a second mode of transmission such that the market information updates are provided only at predetermined intervals. The preferred embodiment monitors the bandwidth consumption to determine what mode of transmission to apply, and in response, it can dynamically change between modes of transmission. By dynamically adjusting the mode of transmission to comport with the current network bandwidth, the preferred embodiments may provide a network friendly, data intensive, and fast response market information feed.

10 Claims, 4 Drawing Sheets

SYSTEM AND METHOD FOR IMPROVED DISTRIBUTION OF MARKET INFORMATION

FIELD OF INVENTION

The present invention is related to electronic exchanges and, more particularly, to improving the way electronic market information is distributed to traders.

BACKGROUND

At one time, there were only open-outcry exchanges where traders, or more specifically buyers and sellers, would come together to trade in person. With the advent of electronic trading, traders may participate at their client devices from remote distances by communicating over physical networks with electronic exchanges that automatically match bids and offers.

In particular, subscribing traders are connected to an exchange's electronic trading platform by way of a communication link and through an application program interface to facilitate real-time electronic messaging between themselves and the exchange. The electronic trading platform includes at least one electronic market, which is at the heart of the trading system and handles the matching of bids and offers placed by the subscribing traders for that market. The electronic messaging includes market information that is distributed from the electronic market to the traders. Once the traders receive the market information, it may be displayed to them on their trading screens. Upon viewing the information, traders can take certain actions including the actions of sending buy or sell orders to the electronic market, adjusting existing orders, deleting orders, or otherwise managing orders. Traders may also use software tools on their client devices to automate these and additional actions.

Although the amount or type of market information published by an electronic exchange often differs, there are some standard pieces of information. For instance, market information usually includes the inside market, which is generally the current lowest sell price (sometimes referred to as the best ask) and the current highest buy price (sometimes referred to as the best bid). Market information may also include market depth, which generally refers to quantities available in the market at the top buy price levels and quantities available in the market at the top sell price levels. Of course, the number of price levels or market depth provided to a trader usually depends on the electronic market. Electronic exchanges may limit the number of price levels or market depth offered because market information can become bandwidth intensive. For instance, an electronic market might offer "5" levels of market depth, which includes the quantities available at the top "5" buy prices and the quantities available at the top "5" sell prices. In addition to providing order book information such as price and quantity information, electronic exchanges can offer other types of market information such as the open price, settlement price, net change, volume, last traded price, the last traded quantity, and order fill information.

Electronic exchanges often struggle to balance the amount and timeliness of market information with the bandwidth limitations of physical networks to deliver a network friendly, data intensive, fast response market information feed. On one hand, a tremendous amount of market information may be generated by an electronic market to adequately characterize a given market, especially when changes in the order book are happening at a rapid rate. Most often, traders want access to as much of this information as possible so that they can make better-informed trades. On the other hand, limitations on the amount of market information passed to the traders are often inherent in the design of physical networks that connect traders to the electronic market.

Generally, to strike a balance, there are two models to how electronic markets deliver market information to client devices. In addition, slight variations of these two models are sometimes used.

The first model involves sending a snapshot update at a programmed time interval. A snapshot update is a message that contains market information such as the inside market and market depth. An advantage of the first model is predictable network bandwidth requirements and normally consistent network performance. A drawback of the first model is that it generally gives a slow response to changing market conditions.

The second model involves sending incremental updates every time the inside market or market depth changes in the order book. An advantage of the second model is that it gives rapid response to changing market conditions as long as the network bandwidth is not surpassed. In particular, once the network bandwidth is surpassed, incremental price updates are generally queued in a first in, first out (FIFO) manner. Unfortunately, a deep queue (a queue with lots of lined-up incremental updates) may result in receiving old incremental updates at the client before receiving new incremental updates.

Despite the attempts made by electronic exchanges to improve the distribution of market information, the disadvantages of the two models arise out of their advantages. For example, according to the first model, a predictable network bandwidth requirement results in a slow response time to changing market conditions. In another example, according to the second model, a fast response time to changing market conditions results in an increased chance of a congested network.

Thus, a need exists for a data distribution system and method that is readily adaptable to communicating market information in a more dynamic way.

BRIEF DESCRIPTION OF THE DRAWINGS

Many aspects of the present embodiments can be better understood with reference to the following drawings. The components in the drawings are not necessarily to scale, emphasis instead being placed upon illustrating example embodiments of the preferred embodiments.

DETAILED DESCRIPTION

I. Overview

A data distribution system and method are described herein to improve the distribution of market information to subscribing client devices. According to a preferred system, at startup, a first mode of transmission may be used to distribute market information. In particular, market information updates are provided every time a change in the order book occurs, such as a change in the inside market or a change in the market depth. If the bandwidth limitation is reached, the preferred system switches to a second mode of transmission. Namely, the market information updates are provided only at predetermined intervals. The system preferably monitors the bandwidth consumption to determine what mode of transmission to apply, and in response, it can dynamically change between modes of transmission. Further, according to the preferred system, aspects of each mode of transmission may be dynamically adjusted.

By dynamically changing or adjusting the mode of transmission to comport with the current network bandwidth, the preferred embodiments may provide a network friendly, data intensive, and fast response market information feed. Other systems, methods, features, and advantages of the present embodiments will be or become apparent to one with skill in the art upon examination of the following drawings and description. It is intended that all such additional systems, methods, features, and advantages be included within the description, be within the scope of the present invention, and be protected by the accompanying claims.

II. Preferred System Architecture

Figure 1:
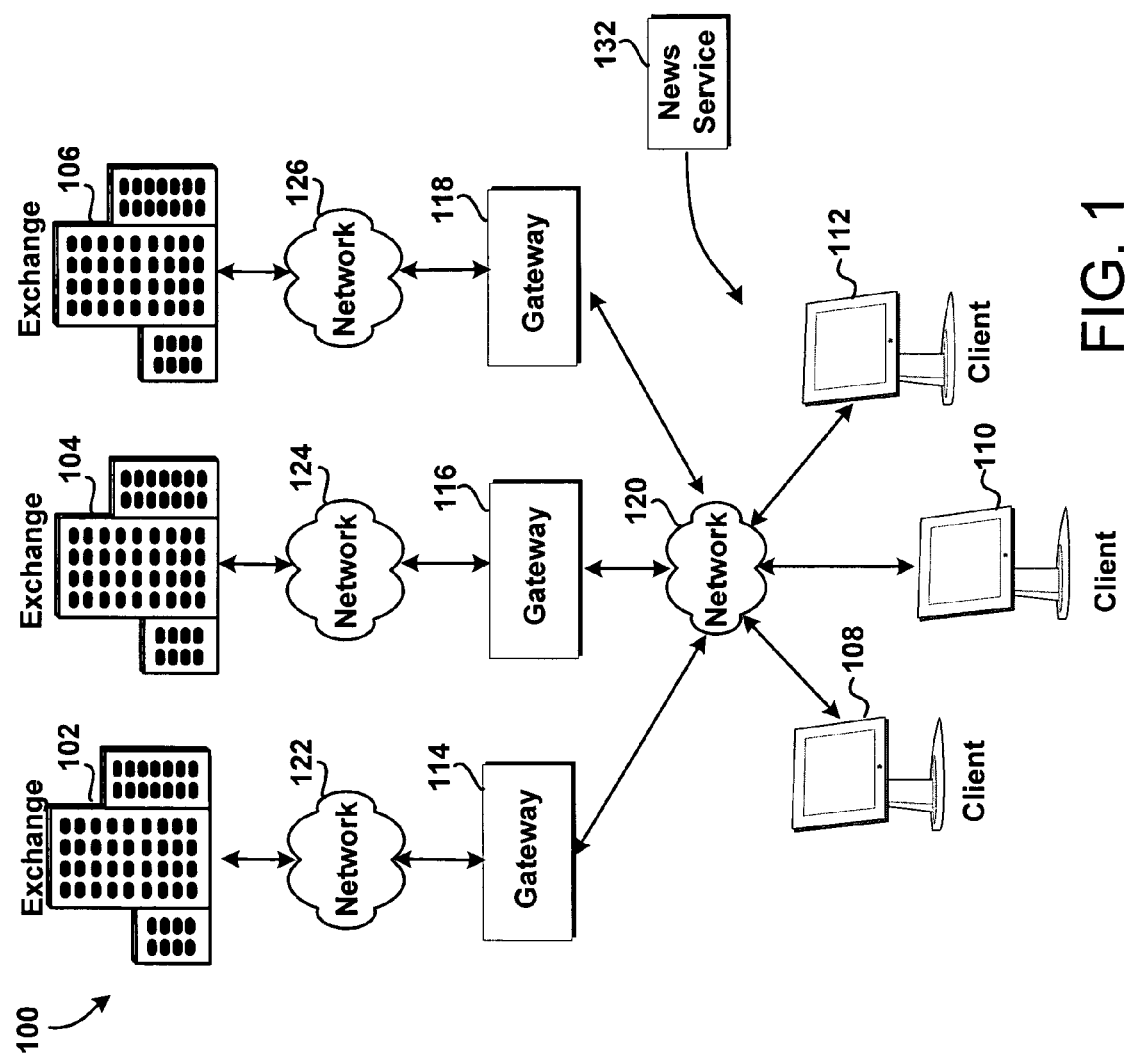
FIG. 1 is a block diagram that illustrates an example electronic trading system that uses the preferred embodiments to distribute market information in a dynamic manner.

FIG. 1 is a block diagram that illustrates an example electronic trading system 100. The electronic trading system 100 includes one or more electronic exchanges 102, 104, 106 and one or more client devices 108, 110, 112. Client devices 108, 110, and 112 might also subscribe to a news service 132. Intermediate devices such as gateways 114, 116, 118, routers (not shown), and other such types of network devices may be used to connect network 120 to networks 122, 124, 126 so that client devices 108, 110, 112 and exchanges 102, 104, 106 can communicate.

It should be understood that the present embodiments are not limited to any particular system configuration. For example, networks 122, 124, 126 could represent the same network, network 120 could represent the same network as networks 122, 124, 126, or client devices 108, 110, 112 could connect directly to gateways 114, 116, 118. In addition, the present embodiments may be implemented with systems that have only one electronic exchange that lists one or more markets.

A. Electronic Exchange

Electronic exchanges 102, 104, 106 represent electronic trading platforms that preferably support electronic transactions of various kinds of tradeable objects. Examples of electronic trading platforms include the London International Financial Futures and Options Exchange (LIFFE), the Chicago Board of Trade (CBOT), the New York Stock Exchange (NYSE), the Chicago Mercantile Exchange (CME), the Exchange Electronic Trading ("Xetra," a German stock exchange), and the European Exchange ("Eurex"). Electronic exchanges 102, 104, 106 might also refer to other facilities, which include basic to complex systems that automatically match incoming orders.

Each of the electronic exchanges 102, 104, 106 may host one or more electronic markets. Traders may connect to the one or more electronic markets to trade tradable objects. As used herein, the term "tradable objects," refers simply to anything that can be traded with a quantity and/or price. It includes, but is not limited to, all types of tradable objects such as financial products, which can include, for example, stocks, options, bonds, futures, currency, and warrants, as well as funds, derivatives and collections of the foregoing, and all types of commodities, such as grains, energy, and metals. The tradable object may be "real," such as products that are listed by an exchange for trading, or "synthetic," such as a combination of real products that is created by the user. A tradable object could actually be a combination of other tradable object, such as a class of tradable objects.

An electronic market can implement any one of the numerous types of order execution algorithms; sometimes the type of algorithm depends on the tradable object being traded. The preferred embodiments can work with any particular order execution algorithm. Some example order execution algorithms include price/time priority (also referred to as first-in-first-out or FIFO) and pro rata-style algorithms. The FIFO algorithm, used for some markets listed with Eurex for example, attempts to give priority to the first person to place an order. The pro rata algorithm, used for some markets listed with LIFFE for example, splits all (or most) orders for the same price at a particular point in time. However, it should be understood that the present invention is not limited to any particular type of order execution algorithm. Benefit from the use of the present embodiments may be found apart from the order execution or matching algorithm used.

It should also be known that an electronic market might include other software and/or hardware components to perform other tasks beyond matching. These software and/or hardware components may be local or remote to the physical location of an electronic exchange. In other words, the components can be operated at the electronic exchange or at locations outside of the electronic exchange such as points of access. Points of access may include gateways or other fast computing devices that are nearby the electronic exchange and have access to other points of access near other electronic exchanges.

B. Gateway

Gateways 114, 116, 118 may be any computing device such as a mainframe, super minicomputer, minicomputer, workstation, or personal computer that connect network 120 to networks 122, 124, 126 so that market information may be successfully passed between client devices 108, 110, 112 and exchanges 102, 104, 106. Preferably, gateways 114, 116, 118 receive market information from exchanges 102, 104, 106 and convert it to a form compatible with the protocols used by client devices 108, 110, 112 using conversion techniques known in the art. Also, as known by those skilled in the art, gateways 114, 116, 118 may have one or more servers to support the data feeds, such as a price server for processing price information, an order server for processing order information, and a fill server for processing fill information. A trader at one of client devices 108, 110, 112 can preferably subscribe to price information, order information, and fill information for a particular electronic market hosted at exchanges 102, 104, 106. Preferably, gateways 114, 116, 118 also receive transaction information, such as orders, order changes, queries, etc. from client devices 108, 110, 112 and forward that information to corresponding exchanges 102, 104, 106.

C. Client Device

Client devices 108, 110, 112 may be computing devices that provide an interface for traders to trade at one or more markets listed with one, some, or all of exchanges 102, 104, 106. Some examples of client devices include a personal computer, laptop computer, hand-held computer, and so forth. Client devices 108, 110, 112, according to the preferred embodiments, include at least a processor and memory. The processor and memory, which are both well-known computer components, are not shown in the Figure for sake of clarity. Preferably, the processor has enough processing power to handle and process the various types of market information.

Memory may include computer readable medium. The term computer readable medium, as used herein, refers to any medium that participates in providing instructions to processor for execution. Such a medium may take many forms, including but not limited to, non-volatile media, volatile media, and transmission media. Non-volatile media includes, for example, optical or magnetic disks, such as storage device. Volatile media includes dynamic memory, such as main memory or RAM (random access memory). Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, and any other memory chip or cartridge, or any other medium from which a computer can read.

Referring to FIG. 1, client devices 108, 110, 112 receive market information from one or more electronic markets hosted at any of electronic exchanges 102, 104, 106. Preferably, market information is displayed to the trader(s) on a visual output device or display device. A trader may also receive news to aid him in analyzing information received from the exchange.

Upon viewing the market information or a portion thereof, a trader may wish to send orders to an exchange, cancel orders in a market, change orders in a market, query an exchange, and so on. To do so, the trader may input various commands or signals into the client device 104, for example, by using one or more conventional means for inputting information such as typing into a keyboard, inputting commands through a mouse, or inputting commands or signals through some other input device.

Upon receiving one or more commands or signals, client devices 108, 110, 112 preferably generate transaction information. In addition to or in place of manual entry, a trader might use automated trading software that automatically or semi-automatically generates transaction information. Of course, there are many different types of messages and/or order types that can be submitted to an electronic exchange, all of which may be considered various types of transaction information. Once generated, for example, transaction information is sent from client device 108 to host exchange 102 over network(s) 120 and 122.

D. Market Information Transmitter

Figure 2:
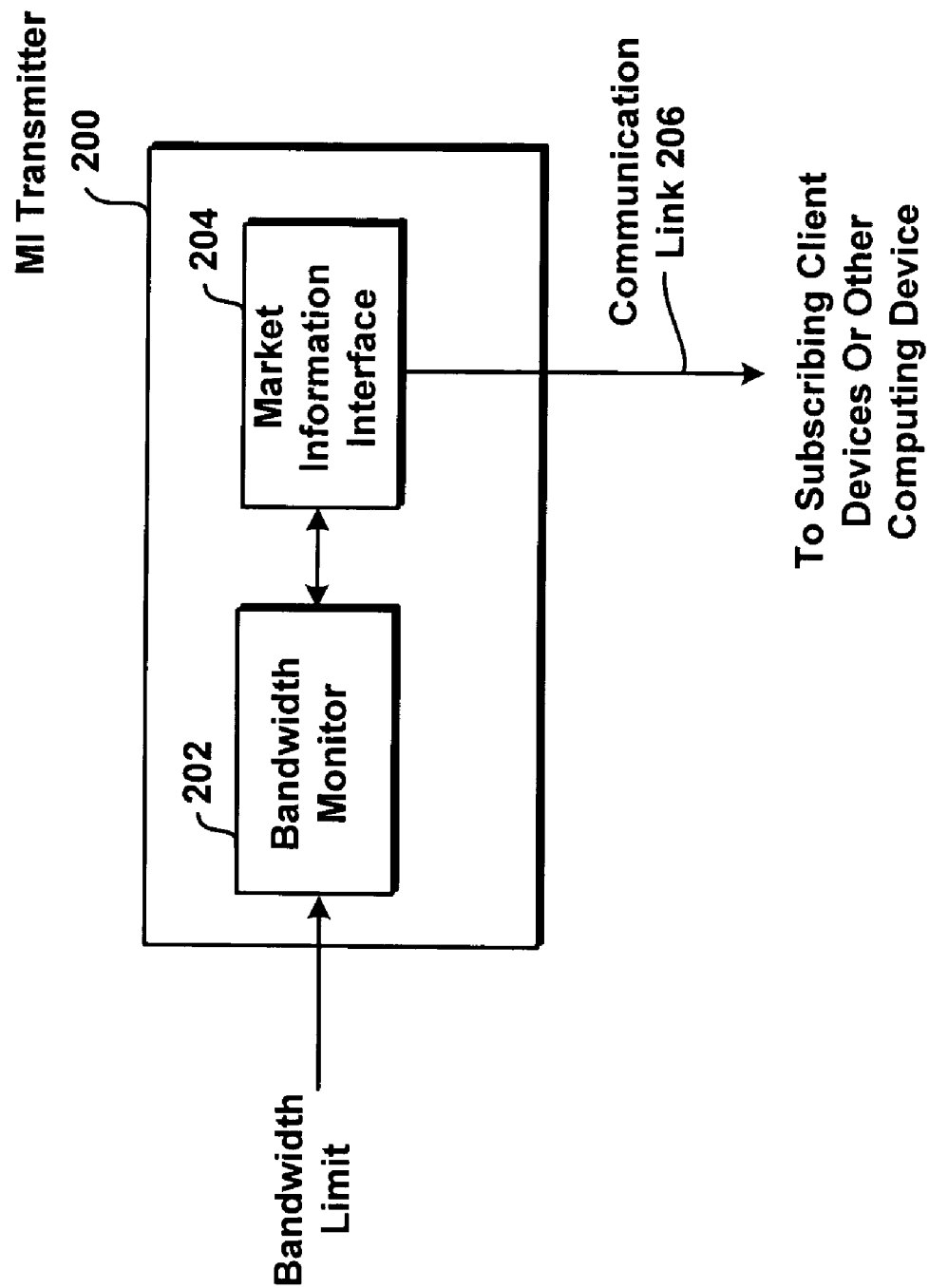
FIG. 2 is a schematic of a preferred embodiment referred to as the MI transmitter for monitoring and adjusting how market information is distributed to subscribing traders.

FIG. 2 is a schematic of an example market information transmitter ("MI transmitter") that implements the preferred embodiments. The MI transmitter 200 may be operated in software, hardware, or a combination thereof. In the preferred embodiments, the MI transmitter 200 is implemented in software that is stored in memory and is executed by a suitable instruction execution system. If implemented in hardware, as in an alternative embodiment, the MI transmitter 200 may be implemented with any technology.

Preferably, the MI transmitter 200 is located at or near an electronic exchange so that it can dynamically adjust the mode of transmission to comport with the current network bandwidth over the entire connection between the information source (usually found at the electronic exchange) and the client device. However, the MI transmitter 200 may be located anywhere in the electronic trading system. For example, referring to the electronic trading system 100 shown in FIG. 1, the MI transmitter 200 may be located at one of the electronic exchanges 102, 104, 106. Alternatively, the MI transmitter 200 may be in connection with any one of networks 122, 124, 126, at any one of gateways 114, 116, 118, or in connection with network 120.

In the preferred embodiments, the MI transmitter 200 includes a bandwidth monitor 202 and a market information interface 204. The bandwidth monitor 202 preferably monitors the bandwidth of communication link 206 outbound to the client device or some other computing device such as a gateway. Communication link 206 is used for distributing market information to client devices, gateways, or other computing devices. For example, referring to FIG. 1, communication link 206 might be defined as the connection from exchange 102 to gateway 114, or alternatively, communication link 206 might be defined as the connection from exchange 102 to client 108. In the preferred embodiments, the bandwidth is the amount of data that can be sent through communication link 206. A greater bandwidth indicates the ability to transmit a greater amount of data over a given period. In response to the bandwidth monitor 202, the market information interface 204 preferably determines what mode of transmission to apply, and may dynamically change between modes of transmission. In addition, the market information interface 204 can preferably adjust each mode of transmission to further customize the distribution of market information.

Figure 3:
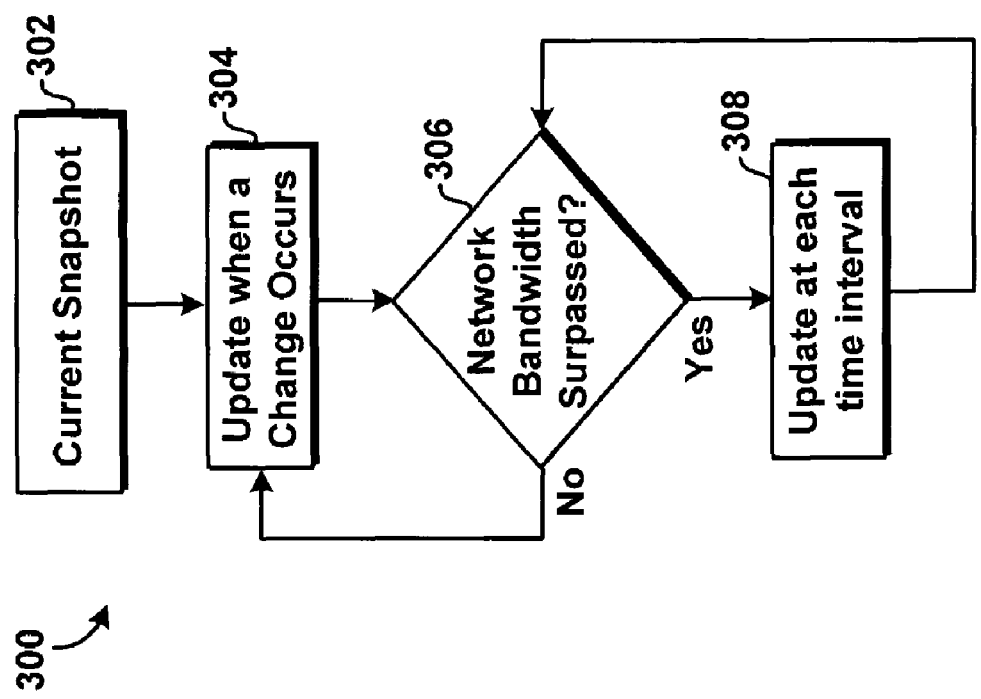
FIG. 3 is a flowchart that illustrates a preferred process implemented by the MI transmitter of FIG. 2 for monitoring and distributing market information to subscribing traders.

The flowchart 300 of FIG. 3 shows the functionality and operation of the MI transmitter 200 shown in FIG. 2. In this regard, each block may represent a module, segment, or portion of code, which includes one or more executable instructions for implementing specific logical functions or steps in the process. Alternate implementations are included within the scope of the preferred embodiment of the present invention in which functions may be executed out of order from that shown or discussed, including substantially concurrently or in reverse order, depending on the functionality involved, as would be understood by those of ordinary skill in the art of the present invention.

At block 302 shown in FIG. 3, the current snapshot of the market order book is preferably provided at the start of the trading session (or at the start of the trading day). For example, this information may be used to initialize and fill the trader's trading display. As described above, electronic markets may often provide varying amounts of market information to their subscribing clients. For example, an electronic market might provide X-levels of prices/depth on the sell side and Y-levels of prices/depth on the buy side (where X and Y represent any given number or the same number). Then, the current snapshot provided at block 302 would preferably include information regarding the X-levels of prices/depth on the sell side and Y-levels of prices/depth on the buy side. The current snapshot might also provide other types of market related information such as the open price, settlement price, net change, volume, last traded price, the last traded quantity, and order fill information.

Alternatively, the current snapshot of the market (given at block 302) may be requested by a client device at any time during the trading day. This may be of particular importance when a trader logs onto an electronic market to trade at a time other than at the start of the trading day, when a client device has missed messages, or when a client device has fallen behind.

For sake of illustration, Table 1, shown below, provides an example snapshot with market information for an electronic market. For this example, assume that the electronic market is providing information on four different orders on the buy side. In particular, there is a buy order for 20 at 100 (item ID #1), a buy order for 50 at 100 (item ID #2), a buy order for 15 at 99 (item ID #3), and a buy order for 25 at 98 (item ID #4).

Of course, similar market information may be provided for orders on the sell side. It should also be noted that the present embodiments are not limited to the example snapshot or its contents as they are illustrated in Table 1. For example, using the preferred embodiments, a complete data feed that contains information on every order in the market's order book may be provided to traders on both the buy side and/or the sell side.

TABLE 1

Snapshot of the Market

| | Buy side | |
|---|---|---|
| Item ID # | Price | Qty |
| 1 | 100 | 20 |
| 2 | 100 | 50 |
| 3 | 99 | 15 |
| 4 | 98 | 25 |

At block 304 in FIG. 3, an update message is preferably provided when a change in the order book occurs. For example, assume that a new order to buy 35 at 100 is now resting in the market's order book. Assume further that the new order is given an item identification number of five (Item ID #5) by the electronic market. Then, an update message is preferably provided that instructs the client devices to "Insert Item ID #5 before Item ID #2." Other types of update messages may also be sent such as change and delete messages. For instance, an update message might instruct the client device to "Change Item ID #2 to Qty of 100." Or, an update message might instruct the client device to "Delete Item ID #3." To one skilled in the art, there are an endless number of possibilities in the way an update message may be configured and it should be noted that any possible update message configuration or message protocols may be used by the present system. One particular protocol which may be used to provide market information is the Financial Information exchange (FIX) protocol, which is a messaging standard developed specifically for real-time electronic exchange type transactions. FIX is a public-domain specification owned and maintained by FIX Protocol, Ltd. Market information may be provided in detail (such as done in the example directly above) where information is given for specific orders, or alternatively, the preferred system may use market information that is aggregated where orders for like prices are aggregated together, for example.

If multiple changes in the market's order book occur simultaneously, then the preferred system may be programmed to send multiple update messages (e.g., one update message for each change). In an alternative embodiment, if multiple changes in the market occur simultaneously, the system could assemble all of the changes into a single update message. For example, if "Insert Item ID #5 before Item ID #2" and "Change Item ID #2 to Qty of 100" both occurred, a single update message may contain the information for both changes.

An advantage of sending update messages every time a change in the market occurs is its responsiveness to changing market conditions. Of course, it should be understood that certain market changes might be more important than other market changes. Therefore, to save on additional bandwidth consumption, it is envisioned that the preferred system may be programmed to always send update messages for particular items of interest that are of great importance and to sometimes send update messages for particular items of interest that are of less importance.

An alternative to sending update messages is to send complete snapshots when a change occurs in the market's order book. In other words, when a change occurs in the market's order book, the MI transmitter 200 may be programmed to provide information on all or most of the depth levels whether they change or not. This alternative embodiment may be useful when multiple things have changed in the market at one instant. Therefore, instead of sending multiple update messages, just one snapshot message may be sent (e.g., the information in Table 1 would be sent instead of updates to one or more values. However, this alternative may not be as desirable as the preferred method using update messages because it might unnecessarily use network bandwidth to send information that hasn't changed from a previous snapshot.

At block 306, the bandwidth monitor 202 preferably determines if the available bandwidth has been surpassed. In the preferred embodiments, the amount of bandwidth (e.g., measured in megabits per second) that the communication link 206 can handle is determined and is referred to herein as a bandwidth limit. The bandwidth limit may be determined by software (and/or hardware) that calculates the communication link bandwidth capacity, or alternatively, the bandwidth limit may be determined theoretically by a network administrator. For example, an electronic exchange might use a T3 line to distribute market information at 43 megabits per second. Then, according to this example, the bandwidth limit might be set at 43 megabits per second. In another example, the bandwidth limit might be set at the lowest common denominator if multiple lines of varying bandwidth are used. Preferably, the bandwidth monitor 202 compares the bandwidth used by the output (e.g., update messages) with the bandwidth limit and determines if the available bandwidth has been surpassed. If multiple communication links are output of the MI transmitter 200, then the bandwidth monitor 202 may compare the bandwidth used by the output with the smallest bandwidth limit.

If the available bandwidth has not been surpassed, then the first mode of transmission may still be used. More specifically, update messages for every change in the order book may continue to be provided. For example, assume that the bandwidth limit is set to J megabits per second. During which, the market is moving fast causing a large number of updates to be created and put out onto communication link 206 equal to K megabits per second. If the bandwidth monitor 202 determines that K megabits per second is less than J megabits per second, then update messages may still be used to distribute market information. In other words, the bandwidth has not been surpassed.

If the available bandwidth has been surpassed, then a second mode of transmission may be applied. Namely, update messages (or snapshots in an alternative embodiment) are provided at a predetermined time interval per block 308. Using the example set forth in the paragraph above, if the bandwidth monitor 202 determines that K megabits per second is greater than J megabits per second, then the second mode of transmission is preferably applied. In other words, update messages (or snapshots in an alternative embodiment) are provided at predetermined intervals. Preferably, the predetermined intervals can be any value so long as the intervals are far enough apart so as not to cause the bandwidth limit to be exceeded. For example, one way to calculate the predetermined intervals (with units in seconds) is to divide the number of megabits an update is equal to by the bandwidth limit (e.g., units are in bits/second). Then, according to this example, an interval would equal 0.1 ms if the bandwidth limit was 1 megabits per second and an update is 100 bits. However, this is just an example, and it should be understood that the present invention is not limited to how the predetermined interval is calculated.

In addition, aspects of each mode of transmission may be dynamically adjusted. For instance, the predetermined intervals may be dynamically adjusted to comport with changing bandwidth limits. For example, if bandwidth utilization is low using the second mode of transmission (note that even if bandwidth utilization is too high using the first mode of transmission, it may be low when using the second mode of transmission especially if the intervals are spaced far apart), then the internals may be dynamically programmed to be shorter whereas if the bandwidth utilization is near its limit, then the intervals may be dynamically programmed to be longer.

In the preferred embodiments, a bandwidth limit was preferably used at block 306 to determine if the network bandwidth has been surpassed. The bandwidth limit may be set for every trader accessing the electronic market. For example, if there were fifty traders, then each trader may be limited to the bandwidth limit regardless of his network connection. However, it is not necessary for an electronic market to be limited by one bandwidth limit. For example, if there were three gateway connections to the electronic market, then there could be up to three bandwidth limits, so that each gateway connection has a bandwidth tailored to it. To illustrate, referring to FIG. 1, assume that gateway 114, 116, and 118 were all three connected to exchange 102. Then, separate bandwidth limits may be placed for each of the connections, if necessary. The examples provided above are given merely to illustrate some possible scenarios of using a bandwidth limit in accordance with the preferred embodiments. However, those of skill in the art would recognize upon reading the description herein that there are virtually endless possibilities on using and applying bandwidth limits in the preferred embodiments.

In addition, bandwidth limits may be changed on the fly. For instance, the communication link bandwidth may be continuously monitored for each independent connection to tailor the data stream according to the independent connection bandwidth. If the bandwidth limit changes, the preferred system may compare the output stream to the new bandwidth limit to determine if the network bandwidth is surpassed. There are many different bandwidth monitoring techniques. For instance, there may be a separate network packet monitor (not shown) that communicates to the MI transmitter 200. Alternatively, the MI transmitter 200 itself may monitor outbound message size and rate.

III. Alternative embodiment

Figure 4:
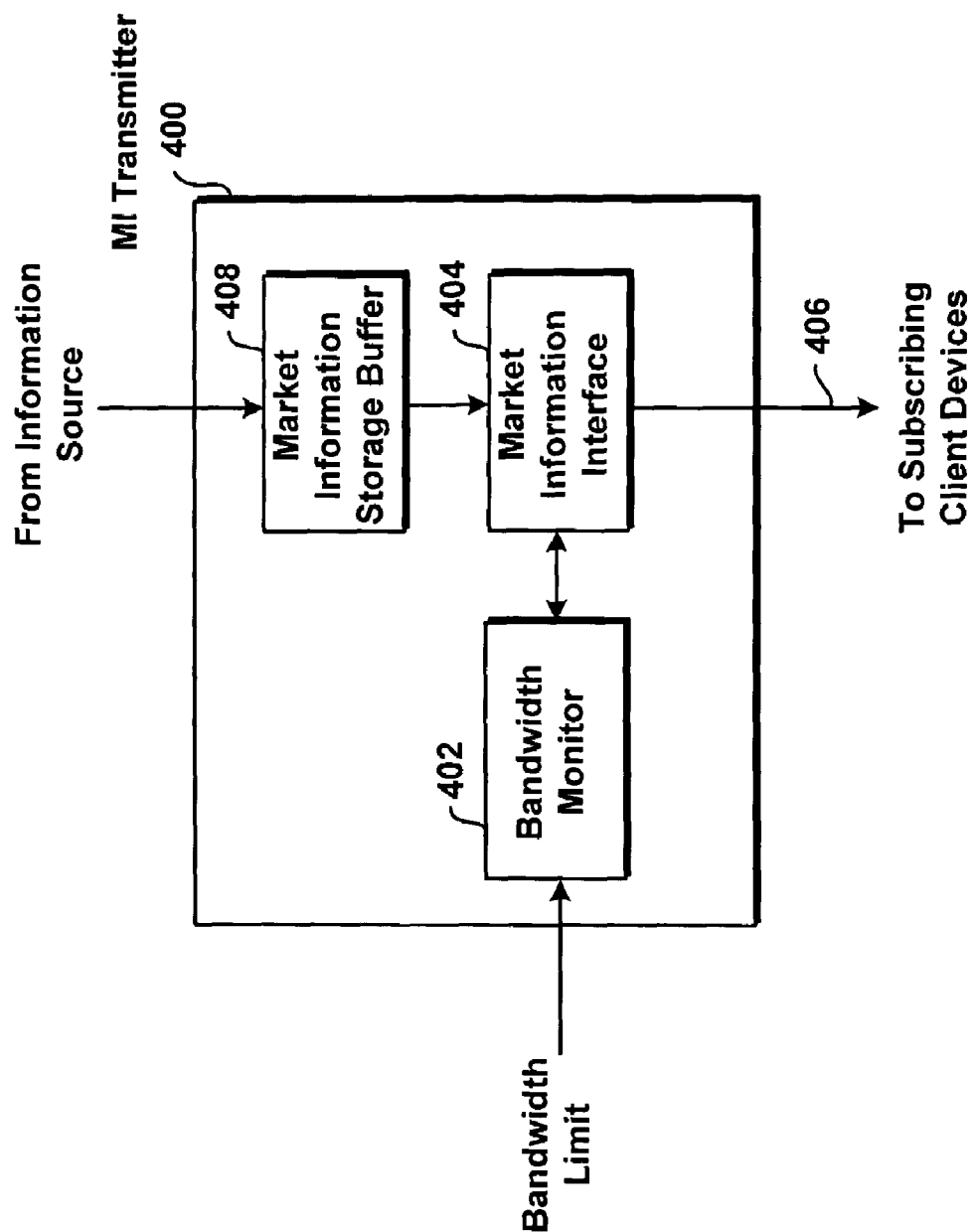
FIG. 4 is a schematic of an alternative embodiment for monitoring and adjusting how market information is distributed to subscribing traders.

FIG. 4 is a block diagram of another example MI transmitter 400, which is similar to the MI transmitter 200 shown in FIG. 2. Similar to the MI transmitter 200, the MI transmitter 400 shown in FIG. 4 may be operated in software, hardware, or a combination thereof. In the preferred embodiments, the MI transmitter 400 is implemented in software that is stored in a memory and that is executed by a suitable instruction execution system. If implemented in hardware, as in an alternative embodiment, the transmitter can be implemented with any technology.

MI transmitter 400 may be used at a gateway or some other electronic device that is located away from the market information source. For sake of clarity in describing the MI transmitter 400, assume that it is implemented at a gateway. Often times, the market information source is located at the electronic market and market information is distributed from the electronic market to one or more gateways before being distributed to client devices. In this alternative embodiment, MI transmitter 400 may be implemented at one of the gateways to dynamically adjust the mode of transmission to comport with the current network bandwidth between the gateway and the client devices.

The alternative MI transmitter 400 includes a bandwidth monitor 402, a market information interface 404 (which are both similar to the bandwidth monitor 202 and the market information interface 204 in FIG. 2), and a market information storage buffer 408. The market information storage buffer 408 may hold market information being sent from the information source (or electronic market) until the information is released out on the communication link 406 according to one of the preferred modes of transmission described above. If more market information is put into the storage buffer 408 than it can handle, and if programmed to do so, the MI transmitter 400 may assemble its own messages out of the market information in the storage buffer 408 to convey the appropriate market information to the trader.

For example, if update messages were building up in the storage buffer 408 because the outbound communication link has reached capacity, then the MI transmitter 400 could automatically consolidate market information from multiple update messages into fewer update messages. So, for instance, update messages such as insert, change, and delete messages may be modified and/or consolidated to reduce the amount of information that is actually released out onto the communication link. To illustrate further, assume that three changes were made to Item ID #2 (e.g., "Change Qty to 15," "Change Qty to 25," and "Change Qty to 10") and all three changes were buffered at the storage buffer 408, when it comes time to send again, the present system may determine to send only the third update message, namely "Change Qty to 10."

IV. Conclusion

The MI transmitter may preferably be used in any electronic trading environment to dynamically adjust the mode of transmission to accommodate current network conditions. The MI transmitter may be implemented at an exchange, at a gateway, or some other common point of access to monitor the communication link between it and the client device(s) and to determine what mode of transmission to apply. Then, the market information is distributed to the client devices according to the particular mode of transmission. The MI transmitter results in a network friendly, data intensive, and fast response market information feed to subscribing traders.

In addition, using the MI transmitter, a complete data feed that contains information on every order in the market may be provided to traders. Using one of the two models that conventional electronic markets use to distribute market information, a complete data feed may not be possible as it can become too bandwidth intensive. However, with the preferred embodiments, the MI transmitter can dynamically change or adjust the mode of transmission to comport with the type of data feed sent (e.g., a complete data feed or a limited data feed) and the current network bandwidth.

It should be emphasized that the above-described embodiments of the present invention, particularly, any "preferred" or "alternative" embodiments, are merely possible examples of implementations set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Moreover, the claims should not be read as limited to the described order or elements unless stated to that effect. Thus, all variations that come within the scope and spirit of the following claims and equivalents thereto are claimed as the invention.

What is claimed is:

1. A method for maximizing the distribution of market information in an electronic trading environment, the method comprising:
   determining a bandwidth limit for a communication link that is used in distributing market information related to a tradeable object from an electronic market via a computing device;
   selecting a first mode of transmission from a plurality of modes of transmission for distributing the market information via the computing device, wherein the first mode of transmission comprises sending a new market update message from the electronic market when a change in a market order book is detected;
   determining whether the bandwidth limit for the communication link is reached via the computing device; and
   in response to determining whether the bandwidth limit for the communication link is reached, dynamically selecting between the first mode of transmission and a second mode of transmission, the second mode of transmission for distributing the market information from a the plurality of modes of transmission via the computing device,
   wherein the second mode of transmission comprises sending a new market information snapshot at a predetermined time interval being dynamically adjustable according to bandwidth utilization of the communication link,
   wherein the market information snapshot comprises an inside market for the tradeable object including a best bid price and a best ask price currently available for the tradeable object.

2. The method of claim 1, further comprising:
   determining that a bandwidth over the communication link is below the bandwidth limit; and
   dynamically selecting the first mode of transmission.

3. The method of claim 1 wherein the communication link comprises a network connection from a market information source to a gateway.

4. The method of claim 1 wherein the communication link comprises a network connection from an electronic market information source to a client device.

5. The method of claim 1 wherein the communication link comprises a network connection from a gateway to a client device.

6. The method of claim 1 wherein determining a bandwidth limit for a communication link comprises manually setting a bandwidth limit.

7. The method of claim 1 wherein determining a bandwidth limit for a communication link comprises measuring the bandwidth limit electronically by software.

8. The method of claim 1 wherein the mode of transmission is dynamically changed from the first mode to the second mode when the second mode maximizes the distribution of the market information more than the first mode.

9. The method of claim 8 wherein the mode of transmission is dynamically changed from the second mode back to the first mode when the first mode maximizes the distribution of the market information more than the second mode.

10. The method of claim 1 wherein aspects of the plurality of modes of transmission may be dynamically adjusted to comport with changing bandwidth limits.

* * * * *

UNITED STATES PATENT AND TRADEMARK OFFICE
CERTIFICATE OF CORRECTION

PATENT NO. : 7,624,063 B1  
APPLICATION NO. : 10/675449  
DATED : November 24, 2009  
INVENTOR(S) : Ryan N Andrews Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1599 days.

Signed and Sealed this

Twenty-sixth Day of October, 2010

David J. Kappos  
*Director of the United States Patent and Trademark Office*